United States Patent [19]

Bergman et al.

[11] Patent Number: 4,789,296

[45] Date of Patent: Dec. 6, 1988

[54] INDUSTRIAL ROBOT

[75] Inventors: Mikael Bergman, Järfälla; Ove Kullborg; Thord Porsander, both of Västerås, all of Sweden

[73] Assignee: ASEA Aktiebolag, Västerås, Sweden

[21] Appl. No.: 15,299

[22] Filed: Feb. 17, 1987

[30] Foreign Application Priority Data

Feb. 18, 1986 [SE] Sweden .................................. 8600725

[51] Int. Cl.$^4$ ................................................ B25J 9/06
[52] U.S. Cl. .................................... 414/735; 414/917; 901/15; 901/23
[58] Field of Search ...................... 414/730, 735, 917; 901/14, 15, 19, 23, 24, 27, 28

[56] References Cited

U.S. PATENT DOCUMENTS

| 3,630,389 | 12/1971 | Schmidt | 901/15 X |
|---|---|---|---|
| 4,396,344 | 8/1983 | Sugimoto et al. | 414/917 X |
| 4,507,046 | 3/1985 | Sugimoto et al. | 414/4 X |
| 4,545,713 | 10/1985 | Beni et al. | 414/1 |
| 4,601,635 | 7/1986 | Ito et al. | 414/730 |
| 4,627,786 | 12/1986 | Minematsu et al. | 414/917 X |
| 4,655,675 | 4/1987 | Yasuoka | 414/917 X |

FOREIGN PATENT DOCUMENTS

| 180560 | 5/1986 | European Pat. Off. |  |
| 2560546 | 9/1985 | France | 901/19 |
| 8603157 | 6/1986 | PCT Int'l Appl. | 901/14 |

Primary Examiner—Robert J. Spar
Assistant Examiner—P. McCoy Smith
Attorney, Agent, or Firm—Watson, Cole, Grindle & Watson

[57] ABSTRACT

The invention relates to an industrial robot of a so-called agile type which has a lower arm (16) with double-sided journalling in a stand (12) consisting of two separated, upright parts (12a, 12b), the arm (16) being pivotable in the space between the stand parts. A pivot shaft (24) for pivoting the upper arm of the robot via a crank and a parallel link rod from one of the stand parts (12a) and through a lead-in opening (28) in the lower arm (16). From the other stand part (12b) there extends a drive shaft (30), which is substantially coaxially opposite to the pivot shaft (24) of the crank (22) and which is connected to the lower arm (16).

5 Claims, 6 Drawing Sheets

INDUSTRIAL ROBOT

TECHNICAL FIELD

The present invention relates to an industrial robot, comprising a stand which is pivotable about a vertical axis; a first arm which, at one end, is pivotable in the stand about a first horizontal axis; a second arm which is pivotable at the other end of the first arm about a second horizontal axis parallel to the first horizontal axis; a link rod arranged in parallel with the first arm, one end of the link rod being connected to the second arm and the other end being fixed to a crank, the pivot axis of which substantially coincides with the first horizontal axis; a first drive member for pivoting the stand about the vertical axis; a second drive member for pivoting the first arm about the first horizontal axis; and a third drive member for pivoting the second arm about the second horizontal axis through the crank and the link rod.

A primary object of the present invention is to achieve an agile robot of the above-mentioned fundamental construction, that is, an industrial robot whose arms are capable of performing large turning movements (large angular deflections), thus imparting a large working area and a long reach to the robot.

BACKGROUND ART

Prior art robots of agile type are normally built up with arms journalled on one side only, resulting in a design with a large width and in limited accessibility and operability in narrow spaces.

In a robot known from the European patent application No. 180 560, the arms of which are double-sided journalled, the drive member for the second arm consists of a ball screw, which results in a limitation of the working range of the robot.

In another prior art robot having arms with double-sided journalling (U.S. Pat. No. 4,545,713), the second arm is driven via steel cables. A disadvantage of this design is that the cables stretch in dependence on the load, which results in poor repetition accuracy of the robot.

SUMMARY OF THE INVENTION

In accordance with the present invention, a new type of agile robot is proposed which has upper and lower arms with double support bearings, the arms being pivotable in the same plane with a possibility of a large pivoting range of at least that arm which is supported in the stand. What is especially characteristic of the industrial robot according to the invention is that the stand comprises two upright parts with an intermediate open space, in which the first arm is pivotable, whereby the pivot shaft of the crank extends from one of the stand parts and through a lead-in opening in the first arm, whereas from the other stand part there extends a drive shaft which is substantially coaxially opposite to the pivot shaft of the crank, which drive shaft is connected to the first arm for pivoting this arm around the first horizontal axis.

In a preferred embodiment of the invention, the first robot arm is double-sided journalled, namely, in the second stand part through two bearings which support the drive shaft of the arm, and in the first stand part through a support bearing which surrounds the pivot shaft of the crank. This latter support bearing can advantageously be supported by a bearing support, which is adjustably clampable in the first stand part. In this way, built-in stress, which may occur when three bearings are placed in a row, can be avoided.

BRIEF DESCRIPTION OF THE DRAWING

The invention will be described in greater detail with reference to the accompanying drawing, wherein.

DESCRIPTION OF THE PREFERRED EMBODIMENTS

Figure 1:
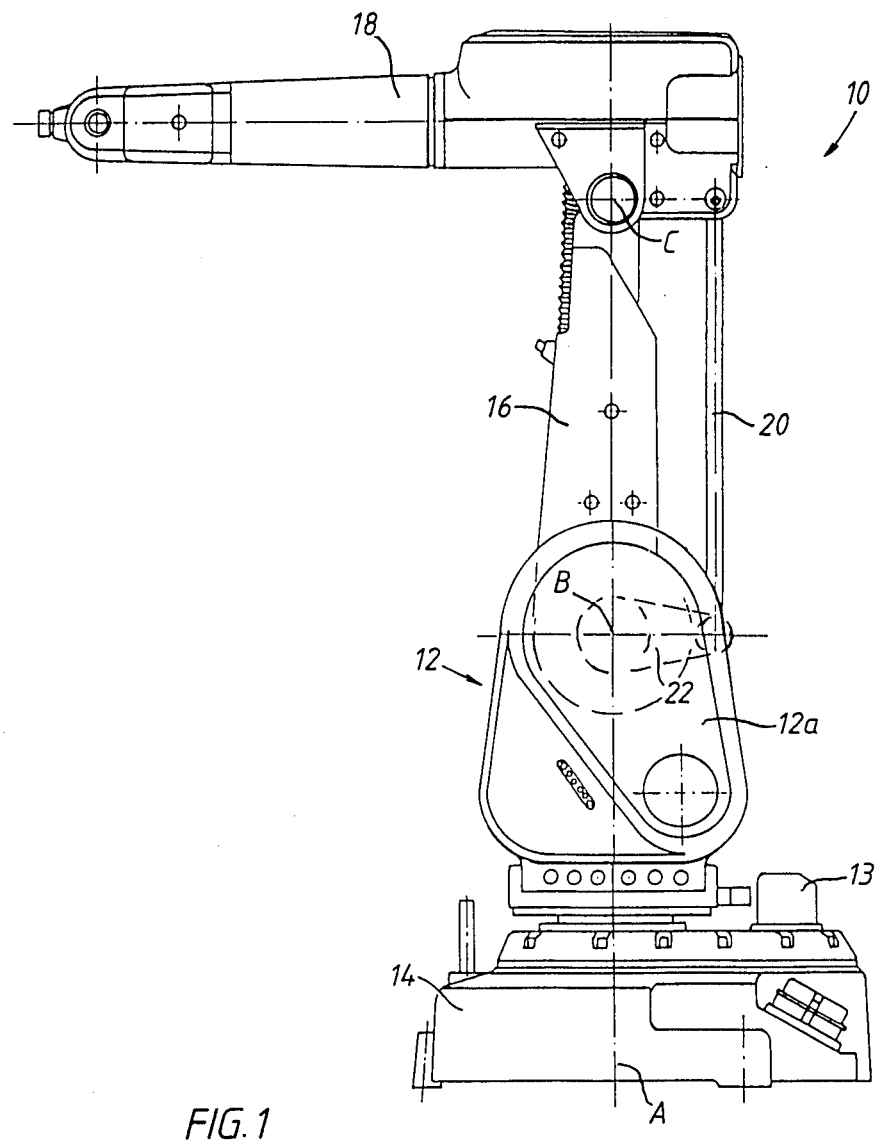
FIG. 1 is a side view of an industrial robot according to the present invention.
Figure 2:
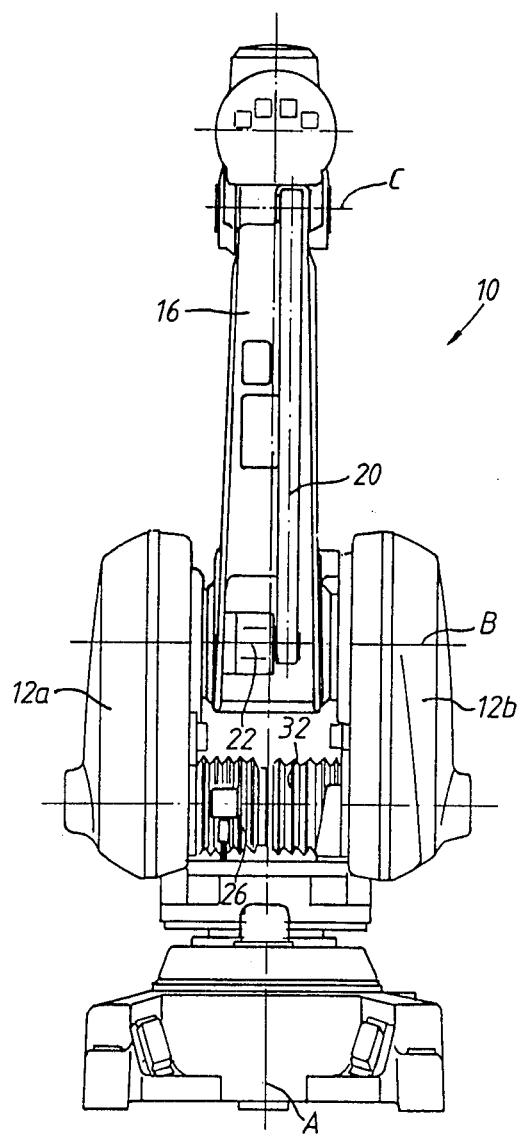
FIG. 2 is a rear view of the robot in FIG. 1.

The industrial robot, generally designated 10 in FIGS. 1 and 2, comprises a stand 12, which by means of a motor 13 can be pivoted relative to a base plate 14 about a vertical axis A. The stand 12 consists of two separated, upright parts 12a and 12b, a first (lower) arm 16 being pivotably journalled around an axis B between the stand parts 12a and 12b in the upper part thereof. At the upper end of the arm 16 a second (upper) arm 18 is pivotable around an axis C through support bearings on both sides of the arm. The pivoting of the arm 18 takes place in a manner known per se over a parallel link rod 20, which is articulately connected to a driven crank 22 and the rear part of the upper arm 18 for forming a parallelogram.

The crank 22 is driven by a shaft 24, which extends from the stand part 12a (see FIG. 3) in which, via a gear wheel unit having a gear wheel 26a, it is driven by an electric motor 26 which is mounted in the lower part of the stand part 12a and extends partially into the space between the stand parts 12a and 12b. The shaft 24 extends through a lead-in opening 28 in the lower part of the lower arm 16.

Figure 4:
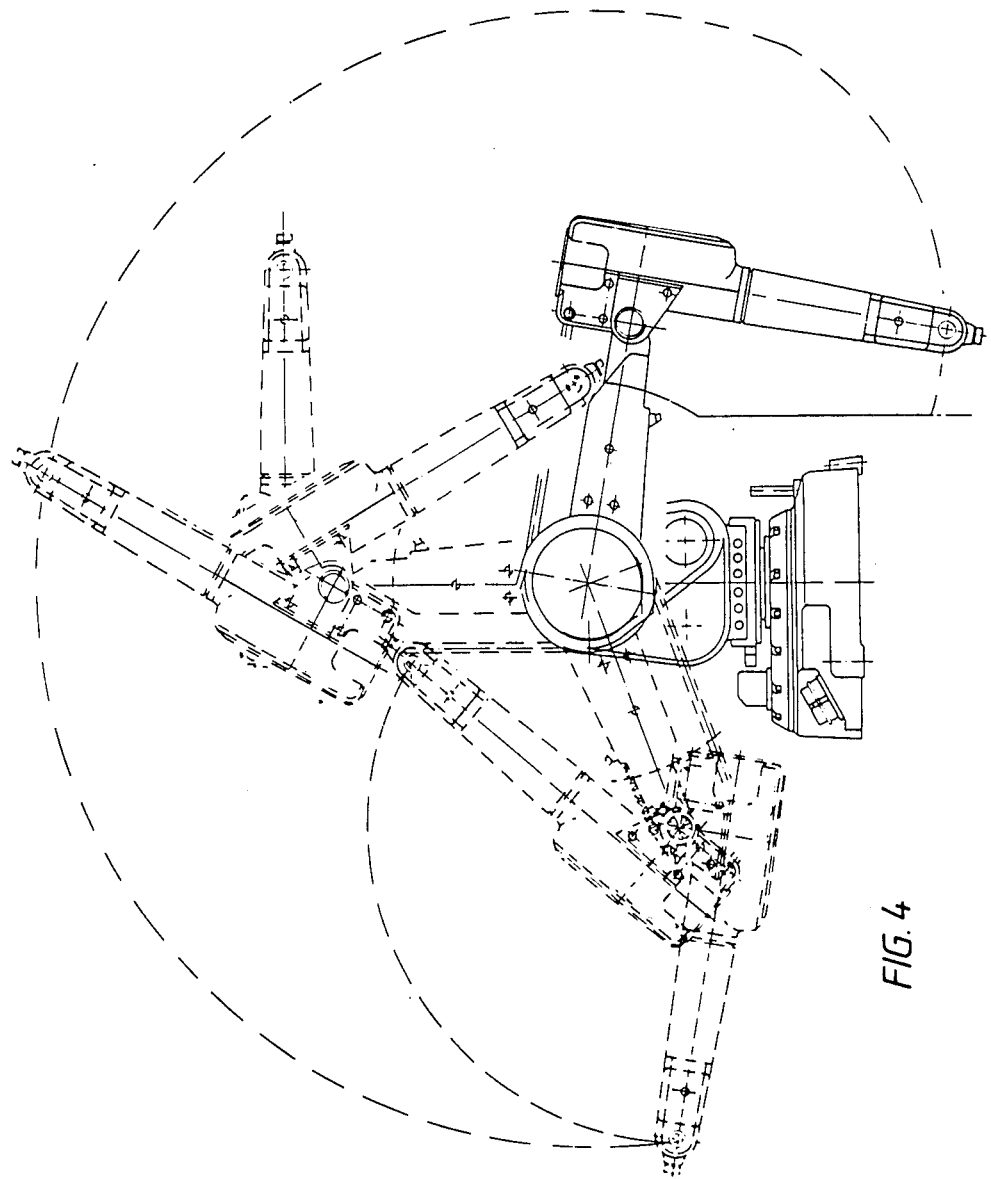
FIG. 4 shows various possible working positions and the working range of the robot in a vertical plane with the stand in a certain turning position about a vertical axis.

Substantially coaxially opposite to the shaft 24 there extends from the opposite stand part 12b a drive shaft 30, one end of which is fixedly connected to the lower arm 16 and which, via a gear unit having a gear wheel 32a, is driven from an electric motor 32 which is mounted in the lower part of the stand part 12b and which, in the same manner as motor 26, extends into the space between the stand parts 12a and 12b but is displaced horizontally relative to the motor 26. This location of the motors results in a relatively small total width of the robot, while at the same time the motors do not detrimentally limit the pivoting ability of the lower arm 16 or the parallel link rod 20, which is particularly clear from FIG. 4, showing different feasible operating positions of the agile robot according to the invention.

Figure 3:
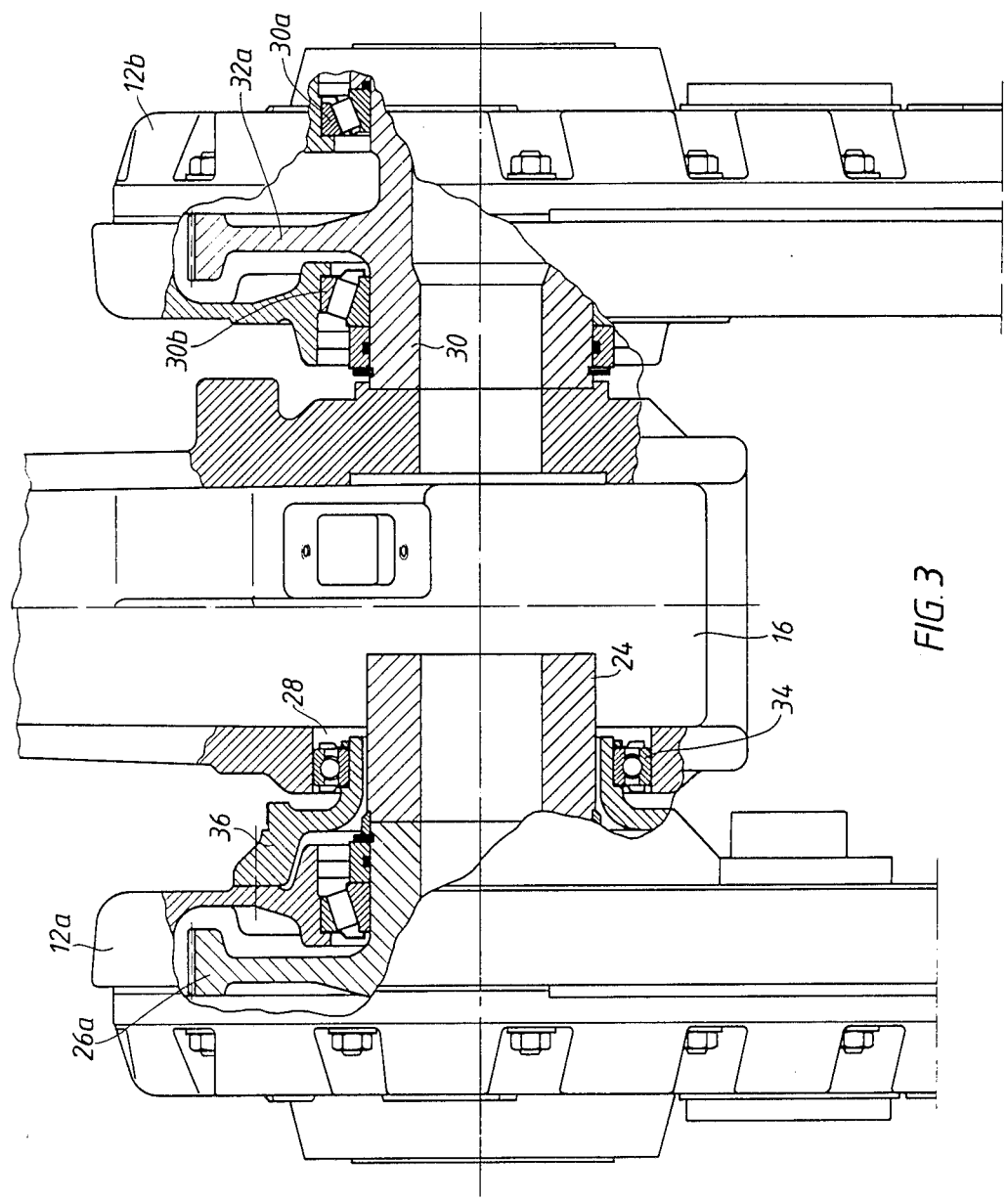
FIG. 3 is a partially sectioned, enlarged view of the mounting of the lower arm of the robot to the stand.

The proposed suspension of the lower arm 16 from two opposed, mutually separated stand parts 12a and 12b makes possible an extremely stable double-sided journalling of the lower arm 16, the drive shaft 30 being journalled on two axially separated bearings 30a and 30b in the stand part 12b, the other side of the arm 16 being journalled on a bearing 34 which is supported in a lead-in opening 28 in the arm 16 through a bearing support 36 adjustably fixed in the stand part 12 (see FIG. 3).

Figure 5:
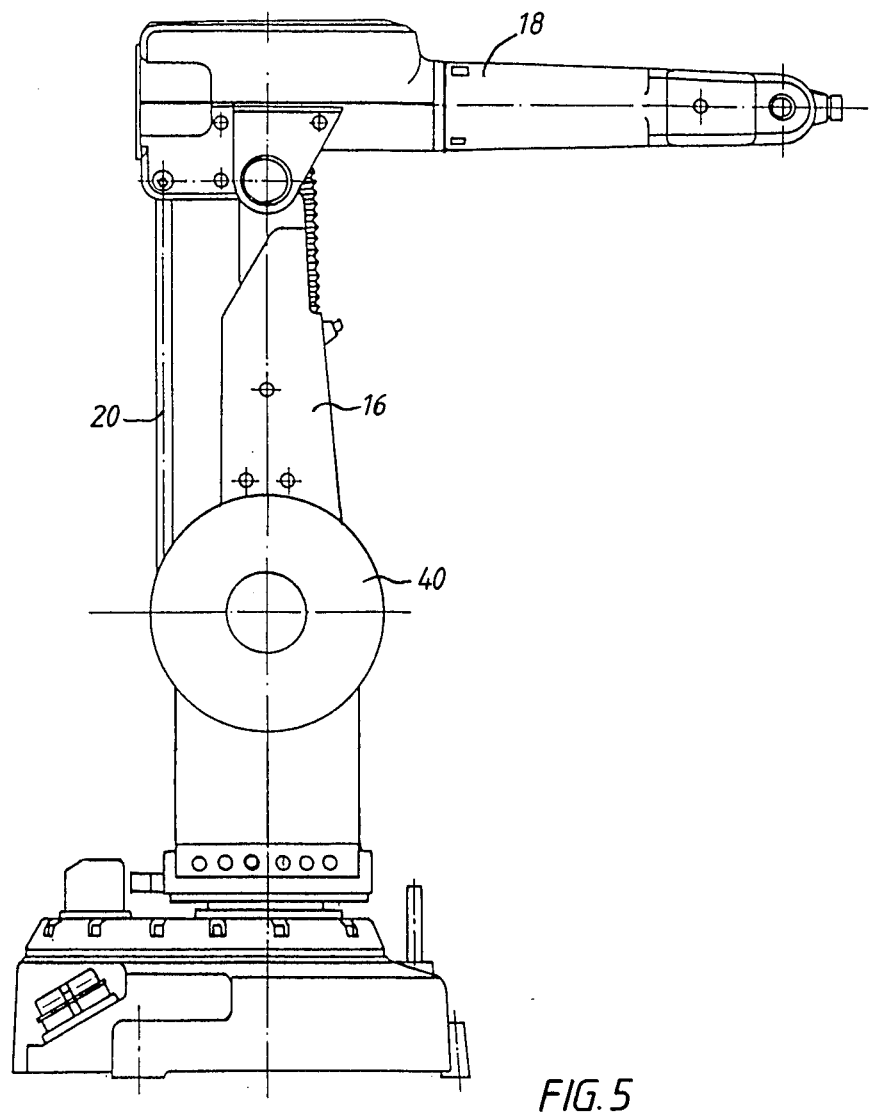
FIG. 5 is a side view of a modified embodiment of the robot according to the invention.
Figure 6:
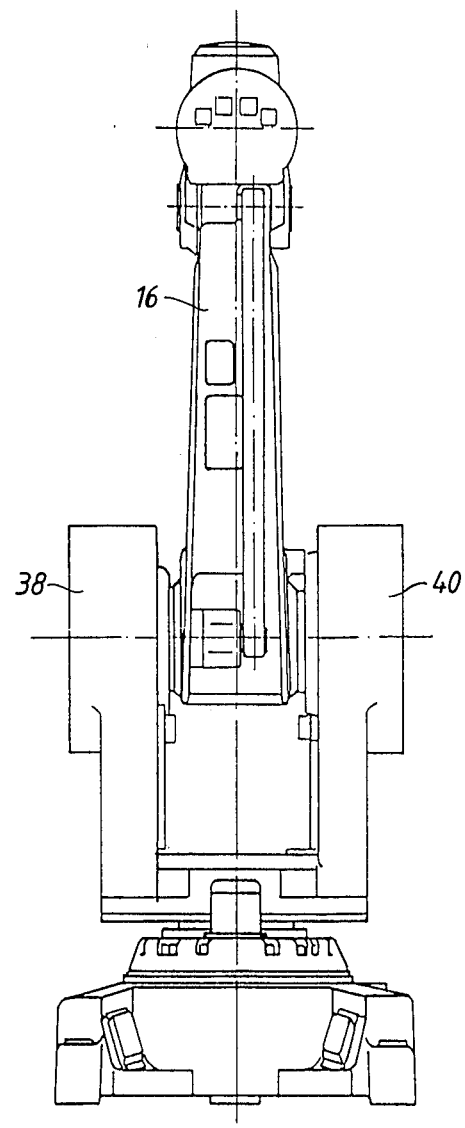
FIG. 6 is a rear view of the robot in FIG. 5.

FIGS. 5 and 6 show a feasible modified embodiment of the robot according to the invention, in which the motors 26 and 32 are replaced by so-called torque motors 38 and 40, which are mounted substantially coaxially with the pivot axis B of the lower arm 16 and drive the crankshaft 24 and the drive shaft 30, respectively, directly without any intermediate gear unit. In this way the total width of the robot can be further reduced while at the same time the driving unit as a whole is constructively simplified.

In the embodiment of the robot according to the invention, described above, the position of the different axes and parts are related to an embodiment in which the robot is supported on a horizontal base. It is, of course, obvious to the person skilled in the art to apply other suitable methods of mounting, for example suspended mounting or lateral mounting.

We claim:

1. An industrial robot comprising a stand which is pivotable about a vertical axis; a first arm having a first end and a second end, said first end being pivotable in the stand about a first horizontal axis; a second arm which is pivotable at the second end of the first arm about a second horizontal axis that is parallel to the first horizontal axis; a link rod arranged in parallel with the first arm, one end of said link rod being connected to the second arm and the other end being fixed to a crank which is driven by a pivot shaft that is substantially coaxial with the first horizontal axis; a first drive member for pivoting the stand about the vertical axis; a second drive member for pivoting the first arm about the first horizontal axis; a third drive member for pivoting the second arm about the second horizontal axis through the crank and the link rod; said stand comprising two upright stand parts defining an intermediate open space therebetween, the first arm being pivotally arranged in said open space, the third drive member being arranged at least partially in the first of said stand parts and being connected to the pivot shaft of the crank, said pivot shaft extending from said first stand part and through a lead-in opening in the first arm, whereas from the second stand part there extends a drive shaft, which is substantially coaxially opposite to the pivot shaft of the crank and which is connected to the first arm for pivoting the first arm about the first horizontal axis, wherein the first arm is journalled in the second stand part through two bearings which support the drive shaft connected to the first arm, and wherein the first arm is journalled in the first stand part through a bearing which surrounds the pivot shaft of the crank.

2. Industrial robot according to claim 1, wherein the second drive member is arranged at least partially in the second stand part.

3. Industrial robot according to claim 1, wherein each of the second and third drive members comprises an electric motor, which, via an individual gear wheel, drives the pivot shaft of the crank and the drive shaft of the first arm, respectively.

4. Industrial robot according to claim 3, wherein the motors are arranged with their axes parallel to the first horizontal axis and extend into the open space between the upright parts of the stand.

5. Industrial robot according to claim 4, wherein the motors are horizontally displaced relative to one another.

* * * * *